(12) United States Patent
Moriya et al.

(10) Patent No.: US 10,010,924 B2
(45) Date of Patent: Jul. 3, 2018

(54) CUTTING DIE

(71) Applicant: AMADA HOLDINGS CO., LTD., Kanagawa (JP)

(72) Inventors: Hideyuki Moriya, Kanagawa (JP); Shigeru Endo, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 0 days.

(21) Appl. No.: 15/300,080

(22) PCT Filed: Mar. 19, 2015

(86) PCT No.: PCT/JP2015/058204
§ 371 (c)(1),
(2) Date: Sep. 28, 2016

(87) PCT Pub. No.: WO2015/151829
PCT Pub. Date: Oct. 8, 2015

(65) Prior Publication Data
US 2017/0136518 A1    May 18, 2017

(30) Foreign Application Priority Data

Apr. 2, 2014   (JP) .................................. 2014-075912
Mar. 6, 2015   (JP) .................................. 2015-044670

(51) Int. Cl.
*B23P 23/02*        (2006.01)
*B23D 1/26*         (2006.01)
(Continued)

(52) U.S. Cl.
CPC ............. *B21D 28/14* (2013.01); *B21D 45/02* (2013.01); *B23D 11/00* (2013.01); *B23D 13/04* (2013.01);
(Continued)

(58) Field of Classification Search
CPC ................ B21D 28/14; Y10T 29/5115; Y10T 409/501148; B23D 11/00; B23D 1/26; B23D 3/02; B23P 23/02; B23P 23/04
(Continued)

(56) References Cited

U.S. PATENT DOCUMENTS 4,443,143 A * 4/1984 Asari ...................... B21C 35/06
                                                              29/81.11
4,685,192 A    8/1987 Braun
(Continued)

FOREIGN PATENT DOCUMENTS

EP         1063041 A2 * 12/2000
EP         3078432 A1 * 10/2016
(Continued)

OTHER PUBLICATIONS

Machine Translation JP 2013-233634 A, which JP '634 was published Nov. 2013.*
(Continued)

*Primary Examiner* — Erica E Cadugan
(74) *Attorney, Agent, or Firm* — Greenblum & Bernstein, P.L.C.

(57) ABSTRACT

In a cutting die having a cutting chip, applied to a punch press, and cutting a work in collaboration with a cutting punch, a resistance member for guiding swarf generated during cutting of the work through the cutting chip and dividing it by giving resistance to it is provided around a scrap discharge hole so that the divided swarf does not remain in the scrap discharge hole but is discharged to an outside so as to prevent clogging by scrap.

6 Claims, 17 Drawing Sheets

(51) Int. Cl.
  *B23D 11/00* (2006.01)
  *B21D 28/14* (2006.01)
  *B21D 45/02* (2006.01)
  *B23Q 11/00* (2006.01)
  *B23D 13/04* (2006.01)

(52) U.S. Cl.
  CPC .......... *B23P 23/02* (2013.01); *B23Q 11/0053* (2013.01); *B23D 1/26* (2013.01); *Y10T 29/5115* (2015.01); *Y10T 83/2083* (2015.04); *Y10T 83/2122* (2015.04); *Y10T 83/8732* (2015.04); *Y10T 409/501148* (2015.01)

(58) Field of Classification Search
  USPC .............................................. 29/30; 409/295
  See application file for complete search history.

(56) References Cited

U.S. PATENT DOCUMENTS

| | | | | |
|---|---|---|---|---|
| 5,078,559 | A | * | 1/1992 | Abe ......................... B23D 1/26 409/304 |
| 5,988,032 | A | * | 11/1999 | Seki ....................... B21D 28/34 83/583 |
| 2006/0072973 | A1 | | 4/2006 | Micali |

FOREIGN PATENT DOCUMENTS

| | | |
|---|---|---|
| JP | 61-173806 | 8/1986 |
| JP | 2000-233340 | 8/2000 |
| JP | 2006-528080 | 12/2006 |
| JP | 4471248 | 6/2010 |
| JP | 2013-233634 A * | 11/2013 |

OTHER PUBLICATIONS

Search Report issued in Japan Patent Application No. PCT/JP2015/058204, dated May 26, 2015.
Office Action issued in Japan Counterpart Patent Appl. No. 2015-044670, dated Oct. 20, 2015.
International Preliminary Report on Patentability issued in Japan Patent Application No. PCT/JP2015/058204, dated Oct. 13, 2016.
Search Report issued in European Patent Office (EPO) Patent Application No. 15772332.1, dated Dec. 4, 2017.

* cited by examiner

Prior Art

Arrangement Like the Fourth Embodiment, but Wherein the Rear of the Opening Portion 52 Includes a Tapered Shape

Fig. 26

ABSTRACT# CUTTING DIE

TECHNICAL FIELD

The present invention relates to a cutting die which finely divides swarf generated during cutting of a work and prevents clogging by scrap.

BACKGROUND ART

Conventionally, as disclosed in Japanese Patent No. 4471248, for example, a tool device including a cutting chip 33 (FIG. 1 in the gazette) is known.

According to the aforementioned gazette, the tool device is constituted by a punch P and a die D mounted on an upper turret 6 and a lower turret 7 of a turret punch press (FIG. 8 in the gazette), for example, and the cutting chip 33 is incorporated in the die D.

According to this constitution, a wide variety of cutting works in general including deburring (FIG. 7(B) in the gazette), V-groove machining, film cutting, dross scratching, chamfering and the like are performed.

CITATION LIST

Patent Literature

PTL 1: Japanese Patent No. 4471248

SUMMARY OF INVENTION

Technical Problem

However, when the aforementioned cutting chip is used for the cutting works in general, a problem described below occurs.

That is, as illustrated in FIG. 18 in the present application, when a work W is cut by a cutting chip 50, swarf K is generated, and this swarf K remains in a scrap discharge hole 39 to cause clogging.

The swarf K is a chip caused by cutting of the work W and is a waste remaining after a valuable portion as a product in the work W has been removed, that is, a scrap generally.

Therefore, when the swarf K remains in the scrap discharge hole 39, clogging by scrap occurs as described above and as a result, if the machining is continued with the clogging by scrap unsolved, disadvantage such as a scratch on a back surface of the work W occurs.

An object of the present invention is to prevent clogging by scrap by finely dividing the swarf generated during cutting of the work.

Solution to Problem

In order to solve the aforementioned problem, the present invention has technical means, for example, as follows:

in a cutting die D having a cutting chip 50, applied to a punch press, and cutting a work W in collaboration with a cutting punch P, the cutting die D (FIGS. 1 to 8) characterized in that a resistance member 51 for guiding swarf K generated during cutting of the work W through the cutting chip 50 and dividing it by giving resistance to it is provided around a scrap discharge hole 39 so that the divided swarf K does not remain in the scrap discharge hole 39 but is discharged to an outside so as to prevent clogging by scrap, and the resistance member 51 is fixed to a side wall 39A of a scrap discharge hole 39 formed in a die body 41 and penetrates through an ejector plate 60.

According to the aforementioned constitution of the present invention, by providing the resistance member 51 (FIG. 1), for example, the swarf K generated during cutting of the work W through the cutting chip 50 passes through an open portion 152 between the cutting chip 50 and the resistance member 51 and is guided into the resistance member 51 and then, then collides against the resistance member 51 and is given resistance and finely divided so that the divided swarf K does not remain in the scrap discharge hole 39 but are discharged to the outside and thus, clogging by scrap does not occur any more, and as a result, a scratch is not caused by the swarf K on the back surface of the work W any more, and a value of the work W as a product is maintained, and cutting is continued.

Advantageous Effects of Invention

As described above, according to the present invention, such an effect is exerted that there is provided a cutting die which finely divides the swarf generated during cutting of the work so as to prevent clogging by scrap.

BRIEF DESCRIPTION OF DRAWINGS

FIG. 26 is a schematic view of a further embodiment of the cutting die according to the present invention.

DESCRIPTION OF EMBODIMENTS

The present invention will be described below by referring to the attached drawings using embodiments.

Figure 1:
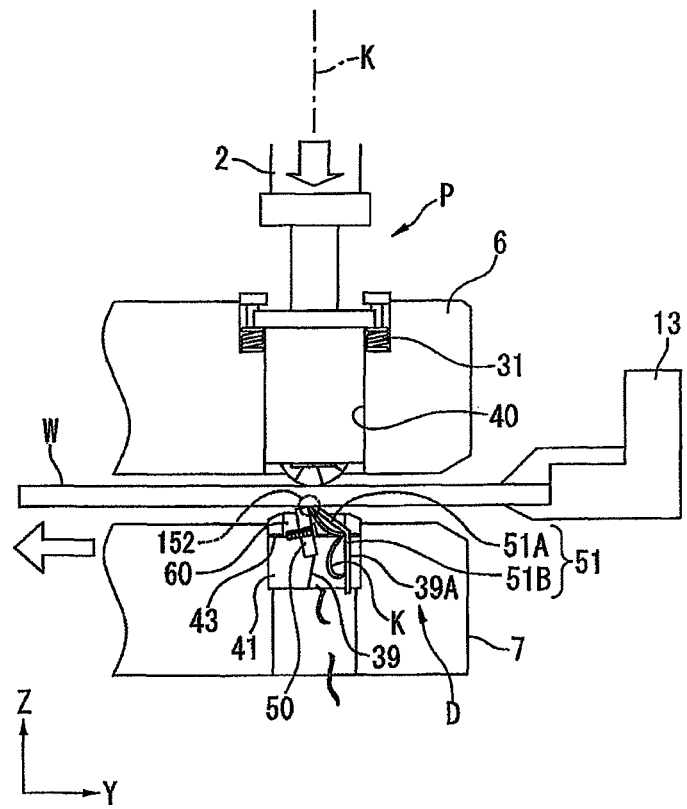
FIG. 1 is a first embodiment of a cutting die D according to the present invention.

FIG. 1 illustrates a first embodiment of a cutting die D according to the present invention. FIG. 1 describes a tool including the cutting die D and a cutting punch P in collaboration with that.

Figure 17A:
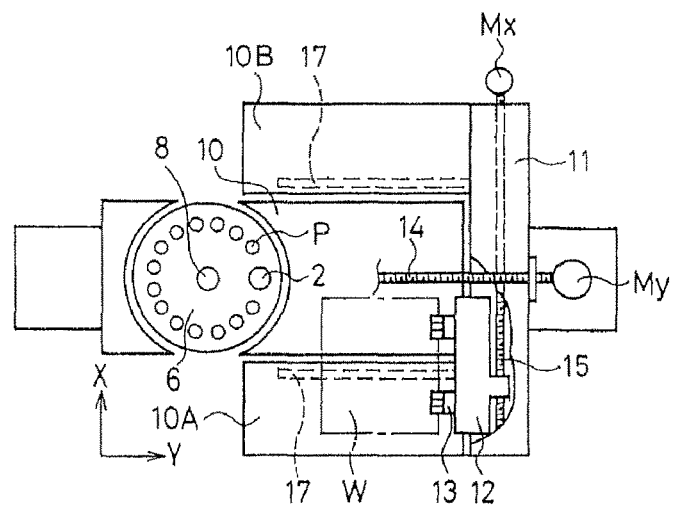
FIGS. 17(A) and 17(B) are views each illustrating an application example of the present invention.
Figure 17B:
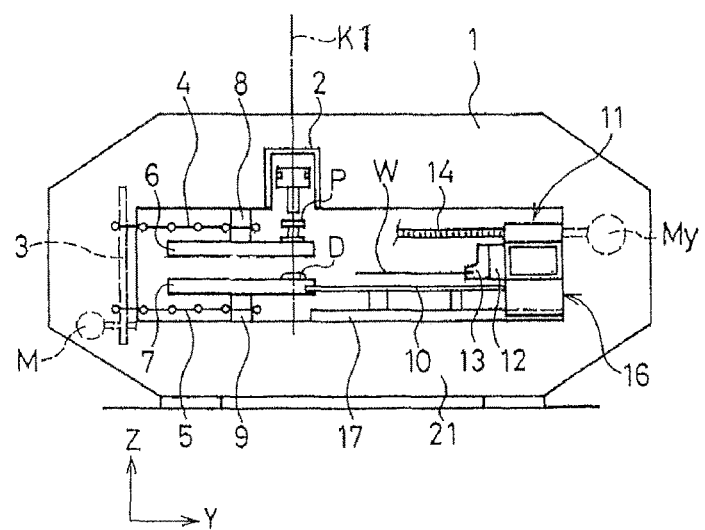

The tool in FIG. 1 is applied to a turret punch press (FIGS. 17(A) and 17(B)), for example, and a ram striker 2 is mounted on an upper frame 1, the cutting punch P is mounted on an upper turret 6, the cutting die D according to the present invention in collaboration with the cutting punch P is mounted on a lower turret 7, respectively.

In the upper turret 6 (FIG. 1), a through hole 40 is formed, and the cutting punch P is supported by an upper edge of the through hole 40 through a lift spring 31.

Further, to the lower turret 7, the cutting die D according to the present invention is fixed.

The cutting die D has a columnar trapezoidal shape as a whole as is well-known (corresponding to FIG. 4), in which a cutting chip 50 is incorporated, an ejector plate 60 covering a die body 41 including the cutting chip 50 is provided, and the ejector plate 60 is urged by a spring 43 (FIG. 1) and communicates with a scrap discharge hole 39.

The cutting chip 50 is used in cutting works in general by placing a work W thereon and moving it, and when seen from a front (corresponding to FIG. 5), it has a diamond shape, for example, with bite-shaped blade edges 50A, 50B, 50C, and 50D formed at tip ends thereof, and is mounted on a chip holder 36 through a bolt 37.

Figure 6:
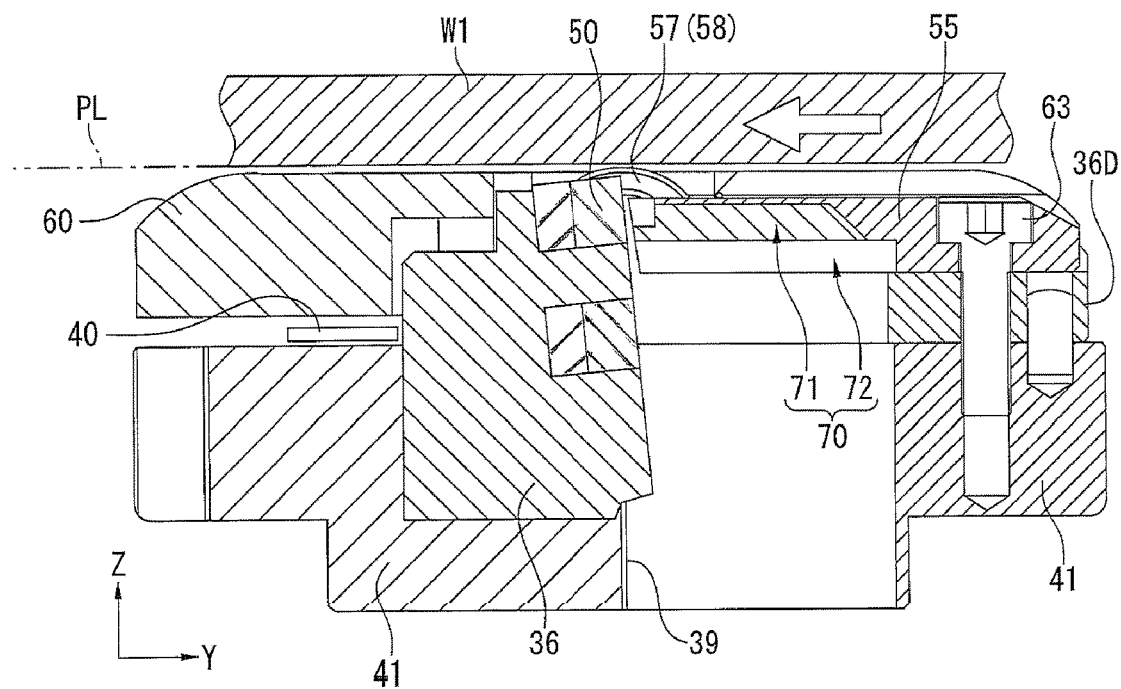
FIG. 6 is a sectional view cut on a line B-B in FIG. 4 (when an ejector plate 60 is raised).
Figure 7:
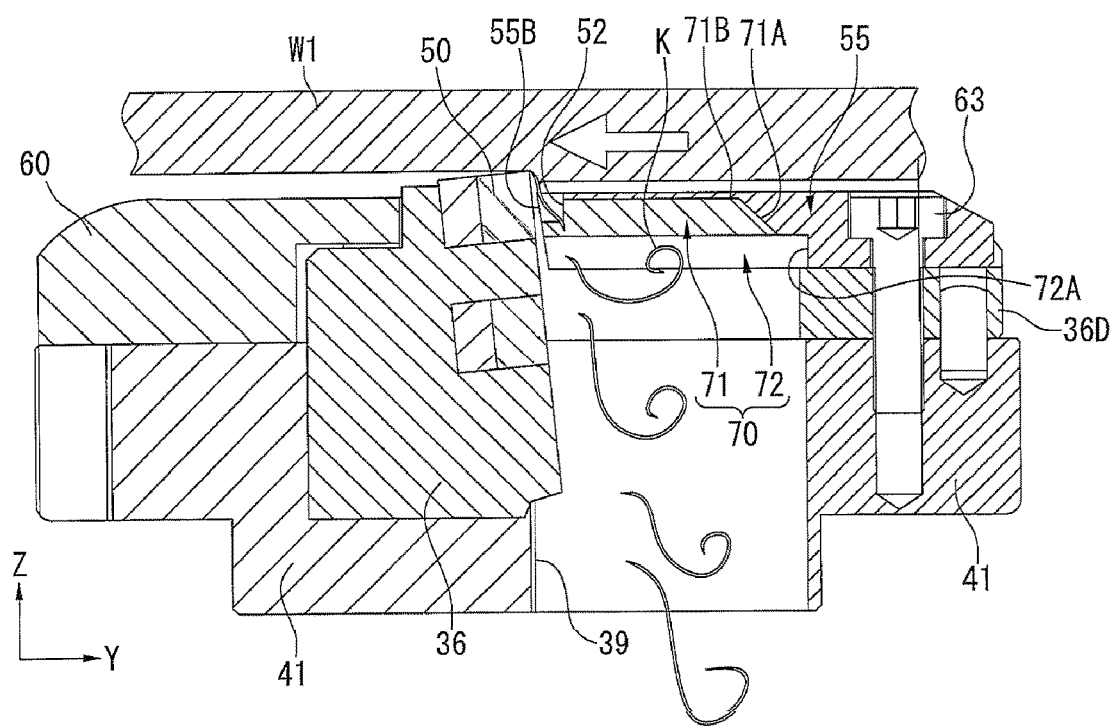
FIG. 7 is a sectional view cut on a line B-B in FIG. 4 (when the ejector plate 60 is lowered).
Figure 8:
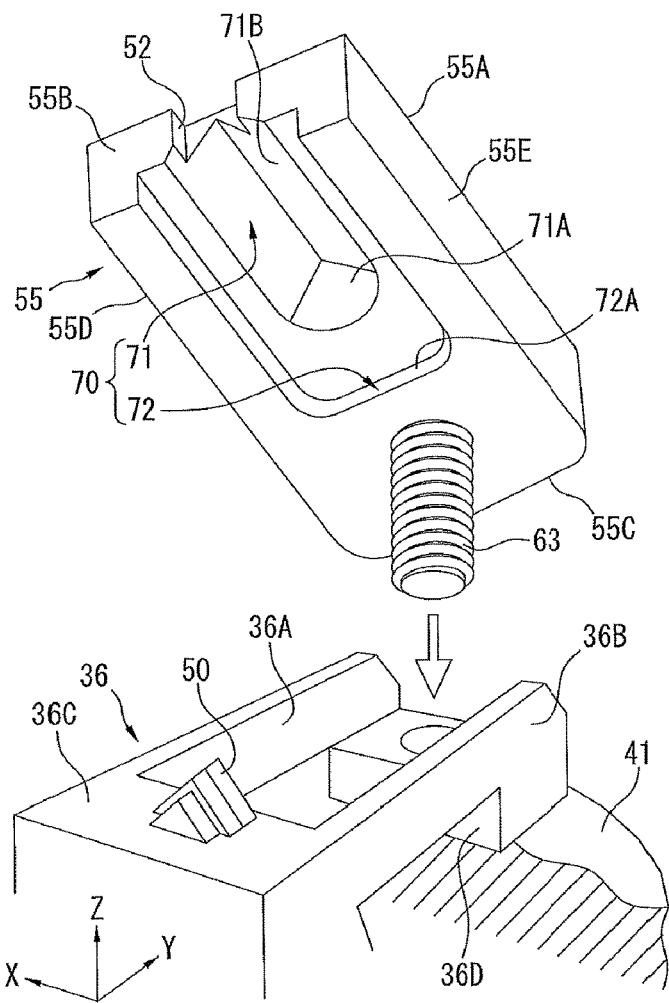
FIG. 8 is a perspective view illustrating a relation between a resistance member 55 and a chip holder 36 in FIG. 4.
Figure 9:
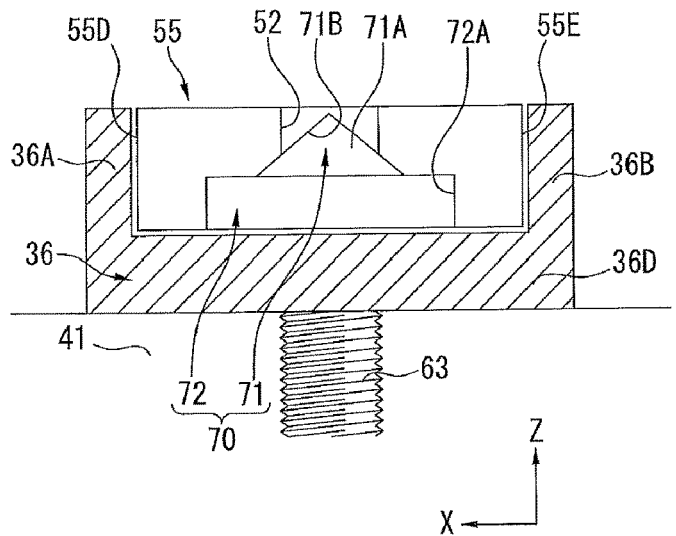
FIG. 9 is a front view illustrating the relation between the resistance member 55 and the chip holder 36 in FIG. 4 when seen from a cutting chip 50 side.

Furthermore, the ejector plate 60 constitutes a simple vertically moving unit instead of an original vertical moving mechanism (FIGS. 6 and 7).

That is, the cutting die D (FIG. 1) according to the present invention usually has the vertically moving mechanism such as a cylinder provided below that and by lowering when the work W is moved, the cutting chip 50 leaves the work W so as not to scratch a back surface thereof, and by rising when the work W is machined, the work W is cut by the cutting chip 50, but the ejector plate 60 constitutes a simple vertically moving unit which will be described later (FIGS. 6 and 7) instead of such original vertically moving mechanism.

Then, as described in FIG. 1, a resistance member 51 fixed to a side wall 39A of the scrap discharge hole 39 formed in the die body 41 and penetrating through the ejector plate 60 is provided.

The resistance member 51 is constituted by a vertical portion 51B extending vertically downward along the side wall 39A of the scrap discharge hole 39 and an inclined portion 51A penetrating through the ejector plate 60 continuously to the vertical portion 51B and extending diagonally upward to get close to a vicinity of an upper part of the cutting chip 50.

In a state where this resistance member 51 is provided, when the ram striker 2 presses the cutting punch P, the cutting punch P lowers and presses the work W.

Therefore, the work W is lowered together with the ejector plate 60 and is moved in contact with the cutting chip 50 while cutting work such as V-groove machining is performed and thus, the swarf K generated at that time is guided so as to pass through the open portion 152 between the cutting chip 50 and the resistance member 51 and collides against the resistance member 51, is given resistance, is finely divided and is discharged through the scrap discharge hole 39 to the outside.

Therefore, according to the present invention, such an effect is exerted that the cutting die which finely divides the swarf generated during cutting of the work so as to prevent clogging by scrap is provided, and since the clogging by scrap does not occur any more, the swarf K does not scratch the back surface of the work W any more, whereby the value of the work W as a product is maintained, and machining is continued.

Figure 18A:
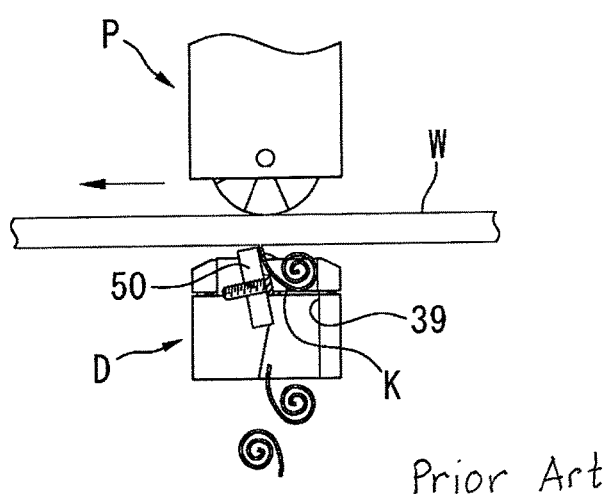
FIG. 18(A) is an explanatory view of a conventional technology.

The first embodiment described above is particularly effective when there is a concern that a long and curled swarf K is generated and remains in the scrap discharge hole 39, which causes clogging by scrap as illustrated in FIG. 18(A).

Note that, a shape of the entire cutting die D, a shape of the cutting chip 50, a function of the ejector plate 60 and the like are all common in the first to sixth embodiments.

Figure 2:
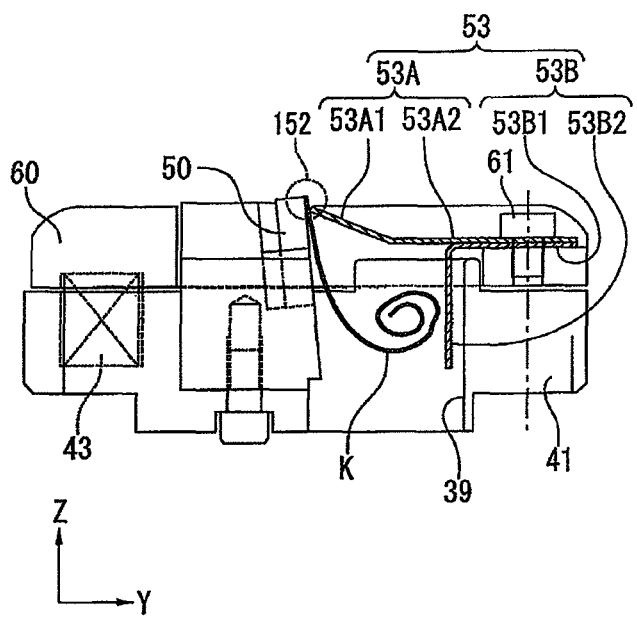
FIG. 2 is a second embodiment of a cutting die D according to the present invention.

FIG. 2 illustrates a second embodiment of the cutting die D according to the present invention.

Figure 3:
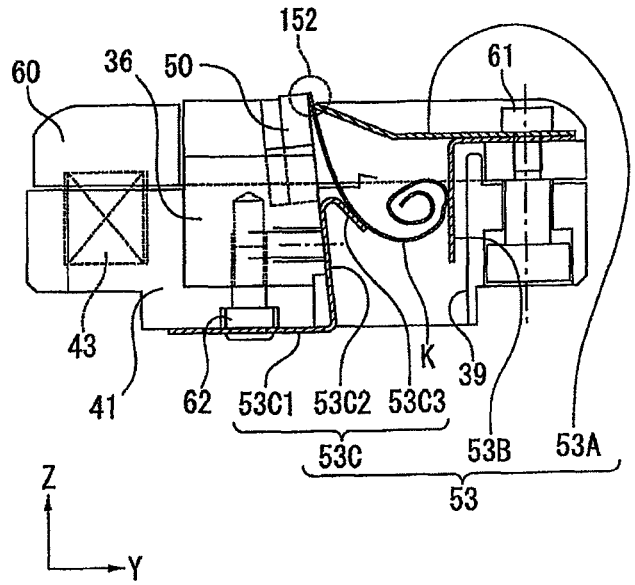
FIG. 3 is a third embodiment of a cutting die D according to the present invention.

In FIG. 2, the cutting punch P which is the other tool, the work W, a clamp 13 gripping it and the like are omitted but only the cutting die D is described, and the same also applies to FIG. 3.

As illustrated, a part of a resistance member 53 fixed to the die body 41 enters into the scrap discharge hole 39.

The resistance member 53 is constituted by horizontal inclined portion 53A and an L-shaped portion 53B fixed to the die body 41 by the same fixing unit, and the L-shaped portion 53B enters into the scrap discharge hole 39.

Among them, the horizontal inclined portion 53A is constituted by a horizontal part 53A2 tightened by a bolt, for example, which is a fixing unit 61 and arranged horizontally and an inclined part 53A1 continuing to the horizontal part 53A2 and extending diagonally upward so as to get close to the vicinity of the upper part of the cutting chip 50.

Further, the L-shaped portion 53B is constituted by a horizontal part 53B1 tightened by a bolt which is the fixing unit 61 and arranged horizontally and a vertical part 53B2 continuing to the horizontal part 53B1, inclined downward at a right angle and entering into the scrap discharge hole 39.

In this state, when the ram striker 2 (corresponding to FIG. 1) presses the cutting punch P, the cutting punch P lowers and presses the work W and thus, the work W lowers together with the ejector plate 60 and moves in contact with the cutting chip 50 while the cutting such as V-groove machining is performed.

Therefore, as illustrated in FIG. 2, the swarf K generated at that time passes through the open portion 152 between the cutting chip 50 and the resistance member 53 and is guided and collides against the resistance member 53, is given resistance and is finely divided and is discharged through the scrap discharge hole 39 to the outside.

The resistance member 53 illustrated in FIG. 2 is particularly effective when there is a concern that the long and curled swarf K is generated and remains in the scrap discharge hole 39 and clogs it as illustrated in FIG. 18(A) similarly to FIG. 1, and thus, the second embodiment in FIG. 2 can be regarded as a variation of the first embodiment in FIG. 1.

Figure 18B:
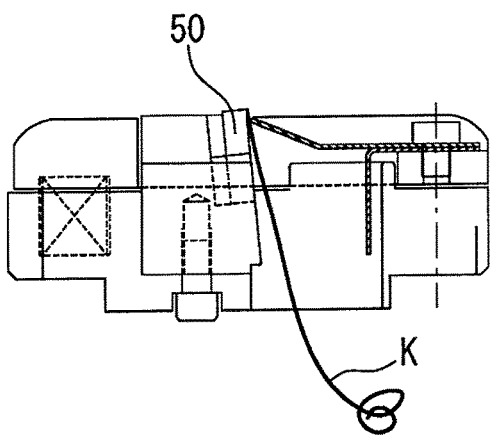
FIG. 18(B) illustrates a view of the second embodiment.

However, in the second embodiment in FIG. 2, as illustrated in FIG. 18(B), the long and curled swarf K may be stretched long downward, and in such a case, the swarf K cannot be divided even by the resistance member 53 in FIG. 2.

Thus, as a third embodiment, as illustrated in FIG. 3, in addition to the horizontal inclined portion 53A and the L-shaped portion 53B fixed to the die body 41 by the same fixing unit, a resistance member 53 constituted by a guidance guard portion 53C fixed to a lower surface of the die body 41 and entering into the scrap discharge hole 39 is provided.

The guidance guard portion 53C is constituted by a horizontal part 53C1 fixed to the lower surface of the die body 41 by a bolt 62, an upward inclined part 53C2 continuing to the horizontal part 53C1, inclined upward at larger than 90 degrees and entering into the scrap discharge hole 39 and in close contact with the chip holder 36 of the cutting chip 50, and a downward inclined part 53C3 continuing to the upward inclined part 53C2 and inclined downward at larger, than 90 degrees in an opposite direction in the scrap discharge hole 39.

With this constitution, when the swarf K is generated due to cutting by the cutting chip 50, the swarf K passes through the open portion 152 between the cutting chip 50 and the resistance member 53 and then hits the downward inclined part 53C3 of the guidance guard portion 53C and changes its course to the right, collides against the horizontal inclined portion 53A and the L-shaped portion 53B originally provided and is given resistance, is finely divided and is discharged through the scrap discharge hole 39 to the outside, whereby clogging by scrap is prevented.

The resistance members 51 and 53 in the aforementioned first to third embodiments (FIGS. 1 to 3) are both fixed to the die body 41 in the end, and in terms of the relation with the scrap discharge hole 39, it is provided around the scrap discharge hole 39 and thus, according to the present invention, the swarf K generated from the work W is divided through the resistance members 51 and 53 and is discharged to the outside without remaining in the scrap discharge hole 39 and thus, the effect of preventing clogging by scrap is exerted.

FIGS. 4 to 9 are views illustrating a fourth embodiment of the present invention.

In the fourth embodiment, too, similarly to the aforementioned first to third embodiments, the cutting die D has a columnar trapezoidal shape (FIG. 4) as a whole as is well-known, the cutting chip 50 is incorporated, the ejector plate 60 covering the die body 41 including the cutting chip 50 is provided, and a resistance member 55 is fixed to the die body 41.

Figure 5:
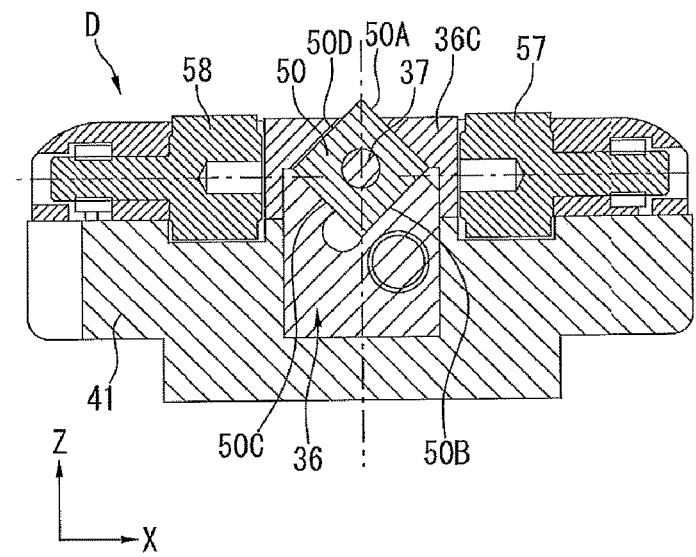
FIG. 5 is a sectional view cut on a line A-A in FIG. 4.

The cutting chip 50 is used in cutting work in general similarly by placing a work W thereon and moving it, and when seen from a front as illustrated in FIG. 5, it has a diamond shape, for example, with the bite-shaped blade edges 50A, 50B, 50C, and 50D formed at the tip ends thereof, and is mounted on the chip holder 36 through the bolt 37.

Figure 4:
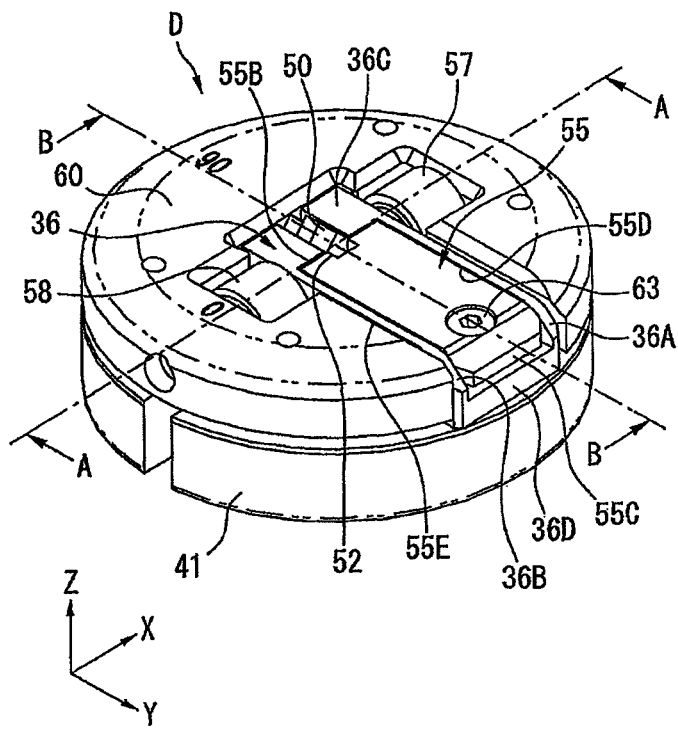
FIG. 4 is an appearance perspective view in a fourth embodiment of a cutting die D according to the present invention.

In the fourth embodiment, as illustrated in FIG. 4, the chip holder 36 of the cutting chip 50 supports the resistance member 55.

That is, in the chip holder 36 (FIG. 8), both side plates 36A and 36B extend to a rear from a head portion 36C on a front to which the cutting chip 50 is fixed, and a base 36D is provided on lower parts in the rear of the both side plates 36A and 36B.

On the other hand, the resistance member 55 of the fourth embodiment (FIGS. 4 and 8) has a cuboid shape as a whole, in which a front surface 55B has the opening portion 52 which faces the cutting chip 50 and the head portion 36C having the chip holder 36 fixed thereto and through which the swarf K passes.

Further, both side surfaces 55D and 55E of the resistance member 55 face the both side plates 36A and 36B of the chip holder 36, and an upper surface 55A and a rear surface 55C are exposed from the chip holder 36.

The resistance member 55 is fixed to the die body 41 through the base 36D of the chip holder 36 by inserting a fixing unit 63 from the upper surface 55A in the vicinity of the rear surface 55C. That is, a rear portion 55F (FIG. 8) of the resistance member 55 is fixed to the die body 41 through the base 36D of the chip holder 36.

Inside the resistance member 55 (FIG. 8), division chamber 70 is formed, and the division chamber 70 is constituted by a first chamber 71 communicating with the opening portion 52 and a second chamber 72 which communicates with the first chamber 71, is located at a position lower than that and a scrap discharge hole 39 side (FIG. 7) of which is opened.

With this constitution, the swarf K having passed through the opening portion 52 (FIG. 7) is guided to the resistance member 55 and then, is given resistance by the first chamber 71 and the second chamber 72 or the first chamber 71 or the second chamber 72 and is divided and is discharged through the scrap discharge hole 39 to the outside, whereby clogging by scrap is prevented.

In more detail, the first chamber 71 is opened at the cutting chip 50 side and at the lower side and is closed at the rear side, and has a ceiling wall 71B having a triangular section communicating with the opening portion 52.

In this case, the closed rear wall 71A (FIGS. 7 and 8) has a shape of a half of a triangular pyramid as a whole for convenience of the tool.

A shape of the ceiling wall 71B of the first chamber 71 is constituted having a triangular section due to the following reason.

That is, the ceiling wall 71B having a triangular section (FIG. 7) guides the swarf K having passed through the opening portion 52 smoothly along the ceiling wall 71B, the swarf K is given resistance and divided by the rear wall 71A, a horizontal wall 72B constituting the second chamber 72 which will be described later, and a side wall 72A having a horseshoe shape as a whole and is carried out through the scrap discharge hole 39 to the outside, whereby clogging by scrap is prevented.

On the other hand, if the swarf K having passed through the opening portion 52 is immediately made to collide against a ceiling wall having a U-shaped section, for example, since it is suddenly given resistance and divided, the scrap is generated near the cutting chip (FIG. 7), which causes clogging by scrap.

In order to eliminate such situation, in the fourth embodiment, the shape of the ceiling wall 71B communicating with the opening portion 52 is a triangular section.

The second chamber 72 located at a position lower than the first chamber is opened at the cutting chip 50 side and at the scrap discharge hole 39 side and communicates with the first chamber 71 through the opened lower part, and has the horizontal wall 72B provided continuing to the first chamber 71 and the side wall 72A orthogonal to the horizontal wall 72B and having a horseshoe shape as a whole.

On the other hand, the ejector plate 60 constitutes a simple vertically moving unit instead of the original vertically moving mechanism as described before (FIGS. 6 and 7). An entire operation of the fourth embodiment including the operation of this ejector plate 60 will be described below.

As illustrated in FIGS. 4 to 6, on both sides of the cutting chip 50 and on the ejector plate 60, rollers 57 and 58 are rotatably provided, and on the rollers 57 and 58, the work W (FIG. 6) is placed.

As illustrated in FIG. 6, when the work W is moved, since the cutting punch P (FIG. 1) is at an upper limit position, for example, the work W (FIG. 6) is not pressed but is moved along a path line PL, while the ejector plate 60 is urged by the spring 43 upward, and the cutting chip 50 is not brought into contact with the work W and its back surface is not scratched.

However, as illustrated in FIG. 7, when the work W is machined, the cutting punch P (FIG. 1) lowers and presses the work W, and the work W (FIG. 7) lowers together with the ejector plate 60 and is moved in contact with the cutting chip 50 and cutting such as V-groove machining is performed, whereby the swarf K is generated, is guided by the aforementioned resistance member 55 and is divided.

That is, the swarf K generated by cutting of the work W passes through the opening portion 52 formed in the front surface 55B (FIGS. 4, 7 and 8) of the resistance member 55 and is guided to the resistance member 55.

Then, the swarf K is given resistance and is finely divided by the rear wall 71A constituting the first chamber 71 of the division chamber 70, the horizontal wall 72B constituting the second chamber 72, and the side wall 72A having a horseshoe shape as a whole as described above, and is discharged through the scrap discharge hole 39 to the outside.

Moreover, in summary, the swarf K having passed through the opening portion 52 which is a part of the open portion 152, that is, the open portion 152(52) (FIG. 7) between the cutting chip 50 and the resistance member 55 is guided to the resistance member 55 and then, is given resistance and is divided by the first chamber 71 and the second chamber 72 or the first chamber 71 or the second chamber 72 and is discharged through the scrap discharge hole 39 to the outside, whereby clogging by scrap is prevented.

Therefore, according to the present invention, it similarly has an effect of providing a cutting die which finely divides the swarf generated when the work is cut so as to prevent clogging by scrap, and since clogging by scrap does not occur any more, the back surface of the work W is not scratched by the swarf K, the value of the work W as a product is maintained, and the machining is continued.

Figure 18C:
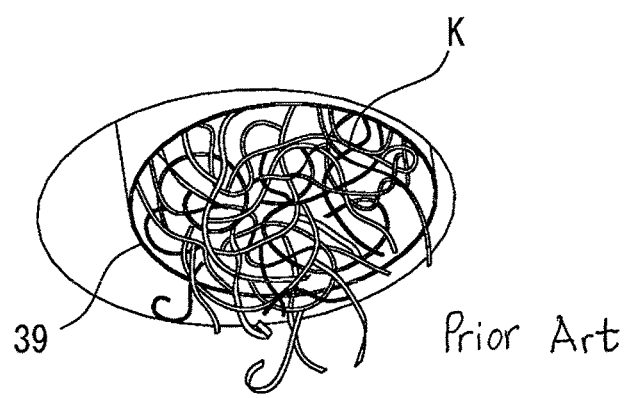
FIG. 18(C) is an explanatory view of a conventional technology.

The fourth embodiment described above is particularly effective when there is a concern that, as illustrated in FIG. 18(C), continuous long swarf K generated as the result of machining of the long V-groove remains in the scrap discharge hole 39 and causes clogging by scrap.

FIGS. 10 to 16(A) and 16(B) are views illustrating a fifth embodiment of the present invention.

In the fifth embodiment, too, similarly to the aforementioned first to fourth embodiments, the cutting die D has a columnar trapezoidal shape (FIG. 10) as a whole as is well-known, the cutting chip 50 is incorporated, the ejector plate 60 covering the die body 41 including the cutting chip 50 is provided, and resistance member 56 is fixed to the ejector plate 60.

That is, a point that the resistance member 56 (FIG. 10) is fixed not to the die body 41 but to the ejector plate 60 is a marked difference from the first to fourth embodiments.

That is because, as in the first to fourth embodiments (FIGS. 1 to 9), when the resistance member 51, 53 or 55 is fixed to the die body 41, if a shallow V-groove is to be machined, a gap between the back surface of the work W (FIG. 7, for example) and the resistance member 55 increases, and the swarf K remains in the gap so as to cause clogging by scrap, it is to be prevented.

That is, as in the fifth embodiment, by fixing the resistance member 56 to the ejector plate 60 (FIG. 10), whether the shallow V-groove is to be machined or the deep V-groove is to be machined, the gap between the back surface of the work W and the resistance member is not varied, and by setting the gap to a predetermined value in advance, the swarf K does not remain in the gap or clogging by scrap does not occur.

In other words, in the fifth embodiment (FIGS. 10 to 16), during the machining of the work W, the work W, the ejector plate 60, and the resistance member 56 are vertically moved integrally on the basis of pressing force of the cutting punch P (FIG. 1) and thus, the gap between the back surface of the work W (FIG. 10) and the resistance member 56 is not changed by the type of the machining, that is, whether it is the shallow V-groove machining or deep V-groove machining, for example.

Moreover, a difference between the first to fourth embodiments and the fifth embodiment is presence of a space portion at a position on the die body 41 and corresponding to the rollers 57 and 58 of the ejector plate 60.

That is, in the first to fourth embodiments, as illustrated in FIG. 5, there is no space portion but it is solid at the position on the die body 41 and corresponding to the rollers 57 and 58 of the ejector plate 60.

Therefore, if the swarf K generated during working of the work W adheres to the rollers 57 and 58 and is clogged between them and the die body 41, clogging by scrap occurs and that interferes with rotation of the rollers 57 and 58 in some cases, and thus, disadvantage occurs that movement of the work W using the rollers 57 and 58 is not performed smoothly.

Figure 11:
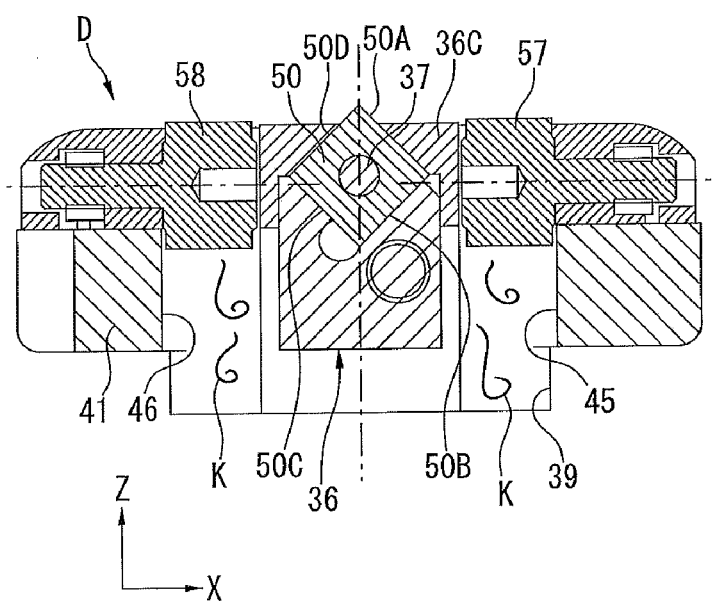
FIG. 11 is a sectional view cut on a line A-A in FIG. 10.
Figure 15:
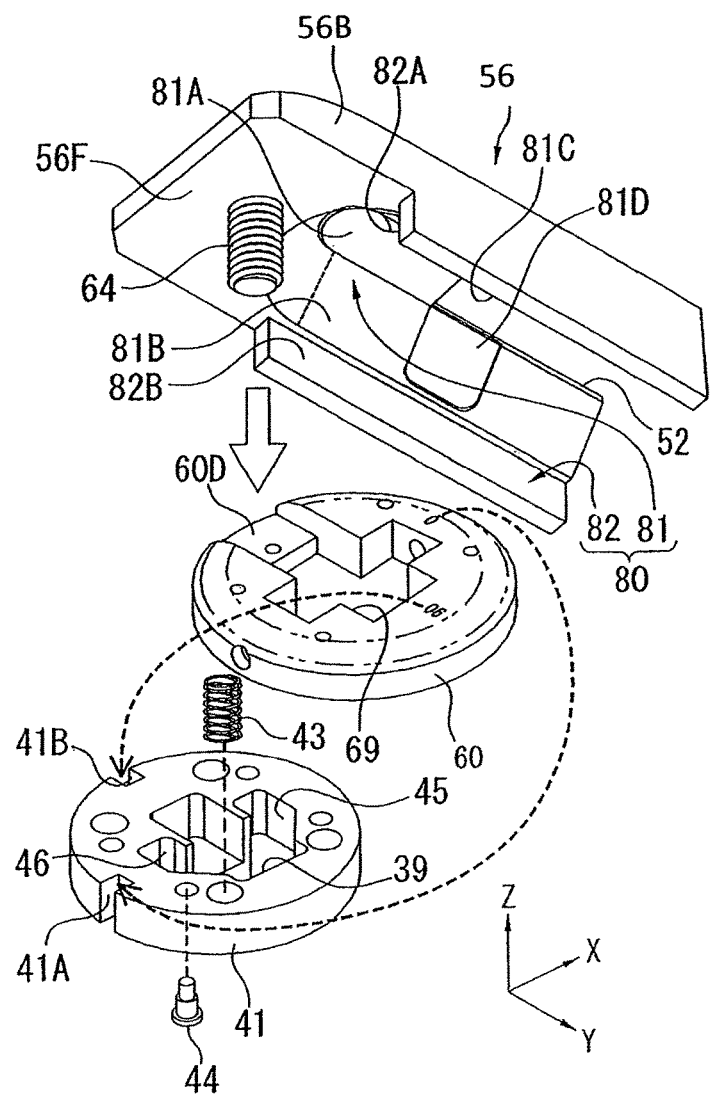
FIG. 15 is a perspective view illustrating a relation between a resistance member 56 and the ejector plate 60 in FIG. 10.

Therefore, in the fifth embodiment, at the position on the die body 41 and corresponding to the rollers 57 and 58 of the ejector plate 60, space portions 45 and 46 communicating with the scrap discharge hole 39 are formed (FIGS. 11 and 15).

With this constitution, according to the present invention, even if the swarf K generated during working of the work W adheres to the rollers 57 and 58 of the ejector plate 60, the adhering swarf K is discharged from the scrap discharge hole 39 through the space portions 45 and 46 to the outside, and clogging by scrap does not occur.

The cutting chip 50 is similarly used for cutting in general by placing the work W thereon and moving it, and as illustrated in FIG. 11, it has a diamond shape, for example, when seen from the front, with bite-shaped blade edges 50A, 50B, 50C, and 50D formed at tip ends thereof, and is mounted on the chip holder 36 through the bolt 37.

Figure 10:
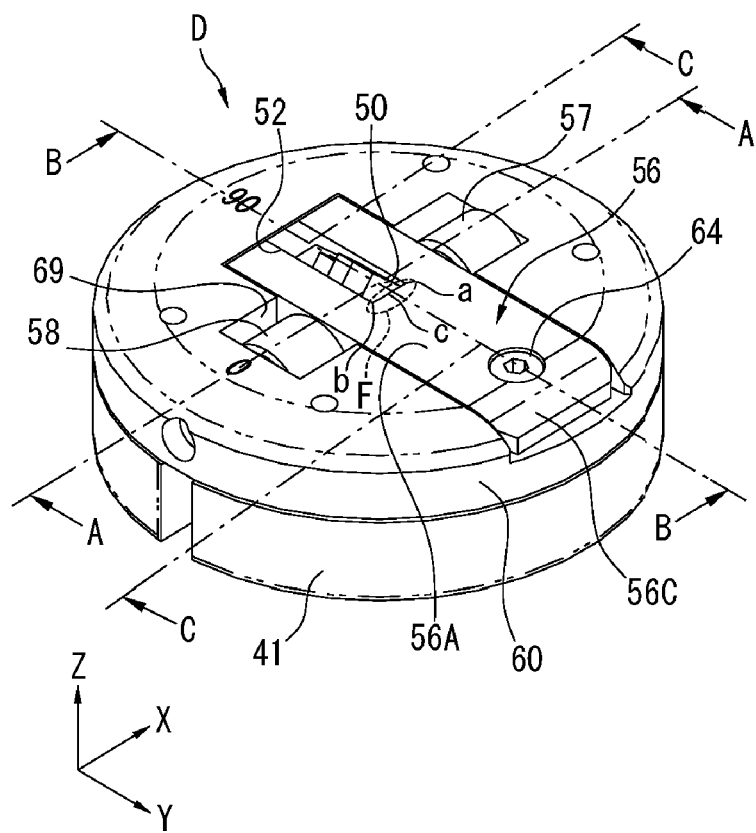
FIG. 10 is an appearance perspective view in a fifth embodiment of the cutting die D according to the present invention.

In the fifth embodiment, as described above, the resistance member 56 is fixed to the ejector plate 60 (FIG. 10).

This resistance member 56 of the fifth embodiment (FIGS. 10 and 15) has an elongated opening portion 52 which is opened at the front and from which the cutting chip 50 (FIG. 10) is exposed, and the swarf K (FIG. 13) generated from the work W passes through this opening portion 52 and is guided to the resistance member 56.

Further, the entire outer side surface 56B of the resistance member 56 (FIG. 15) faces the rollers 57 (FIG. 10) on the ejector plate 60 side and 58 and an entire inner side surface 69, and an upper surface 56A and a rear surface 56C are exposed from the ejector plate 60.

The resistance member 56 (FIG. 10) has a fixing unit 64 such as a bolt, for example, inserted from the upper surface 56A in the vicinity of the rear surface 56C, and a rear portion 56F of the resistance member 56 is fixed to the ejector plate 60 through a stepped portion 60D of the ejector plate 60 (FIG. 15).

The ejector plate 60 to which the resistance member 56 is fixed is mounted on the die body 41 on which the space portions 45 and 46 described above are formed through the spring 43 and a stopper 44 (in this case, positions of numbers 0 and 90 described on the ejector plate 60 (FIG. 15) are assumed to be positioned at positions of keyways 41A and 41B to the lower turret 7 (FIG. 1) of the die body 41, respectively, so that the angle position of the cutting die D according to the present invention in the turret punch press (FIG. 17) is known.

That is, in the fifth embodiment, by fixing the resistance member 56 to the ejector plate 60, during working of the work W (FIG. 13), the work W, the ejector plate 60, and the resistance member 56 are vertically moved integrally so that the gap between the back surface of the work W and the resistance member 56 is not varied depending on the type of working and the clogging by the swarf K in the gap does not cause clogging by scrap.

Inside the resistance member 56 (FIG. 15), a division chamber 80 is formed, and the division chamber 80 is constituted by a first chamber 81 communicating with the opening portion 52 and a second chamber 82 which communicates with the first chamber 81 and is located at a position lower than that and the scrap discharge hole 39 side (FIG. 13) of which is opened.

With this constitution, similarly, the swarf K having passed through the opening portion 52 (FIG. 13) which is a part of the open portion 152, that is, the open portion 152(52) between the cutting chip 50 and the resistance member is guided to the resistance member 56 and then, is given resistance by the first chamber 81 and the second chamber 82 or the first chamber 81 or the second chamber 82 and is divided and is discharged through the scrap discharge hole 39 to the outside, whereby clogging by scrap is prevented.

In more detail, the first chamber 81 is opened at the opening portion 52 side on an upper side, at the front side (right side in FIG. 15), and at a lower side, and has a horizontal ceiling wall 81A at the same height position as the opening portion 52 and an inclined wall 81B having a U-shape in entirety gradually opening downward continuing to the horizontal ceiling wall 81A and the opening portion 52.

Figure 16A:
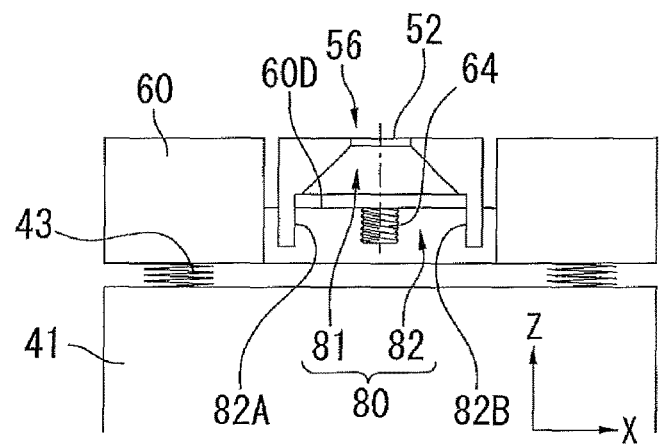
FIGS. 16(A) and 16(B) are front views each illustrating a relation between the resistance member 56 and the ejector plate 60 in FIG. 10 when seen from the cutting chip 50 side.
Figure 16B:
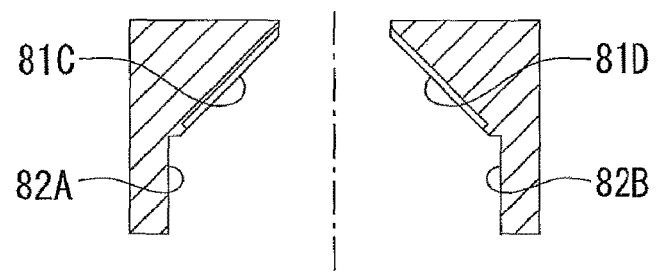

In this case, substantially at the middle of the inclined wall 81B having a U-shape in entirety and at a position corresponding to the cutting chip 50, relief portions 81C (FIG. 15) and 81D to the blade edges 50D (FIG. 11) and 50A of the cutting chip 50 are provided (FIG. 16(B)).

This is because, in the fifth embodiment, the resistance member 56 is fixed to the ejector plate 60, and when the ejector plate 60 is vertically moved, the resistance member 56 is also vertically moved at the same time, and thus the relief portions 81C (FIG. 15) and 81D are provided to avoid interference between the resistance member 56 and the cutting chip 50.

The second chamber 82 located at the position lower than the first chamber 81 is opened at a front side (right side in FIG. 15), at a rear side (left side in FIG. 15), and at a lower side, that is, the scrap discharge hole side (FIG. 13) and communicates with the first chamber 81 (FIGS. 15 and 16(A)) through the opened lower side.

The second chamber 82 has vertical walls 82A and 82B provided along a longitudinal direction (Y-axis direction) of linear portions on both sides at a lowermost end of the inclined wall 81B having a U-shape in entirety constituting the first chamber 81.

Figure 12:
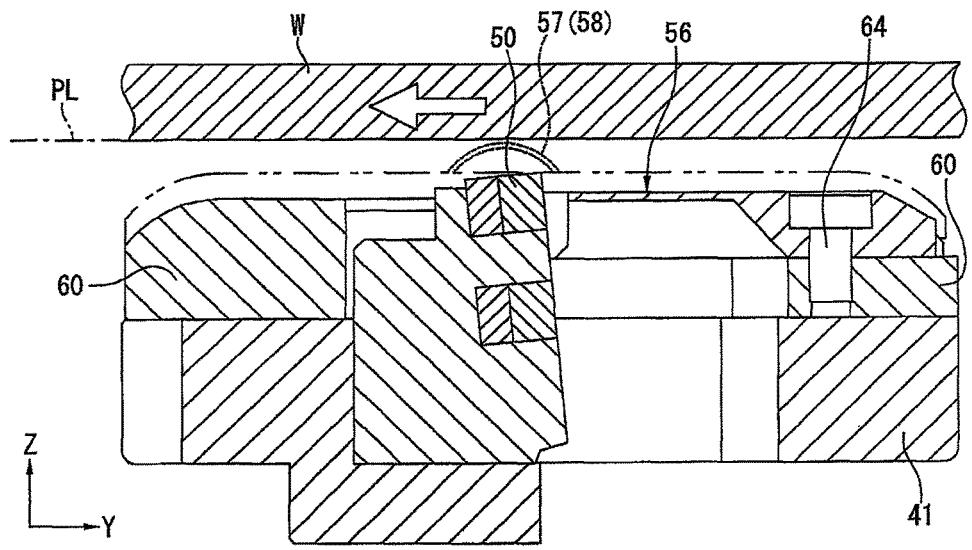
FIG. 12 is a sectional view cut on a line B-B in FIG. 10 (when the ejector plate 60 is raised and lowered).
Figure 13:
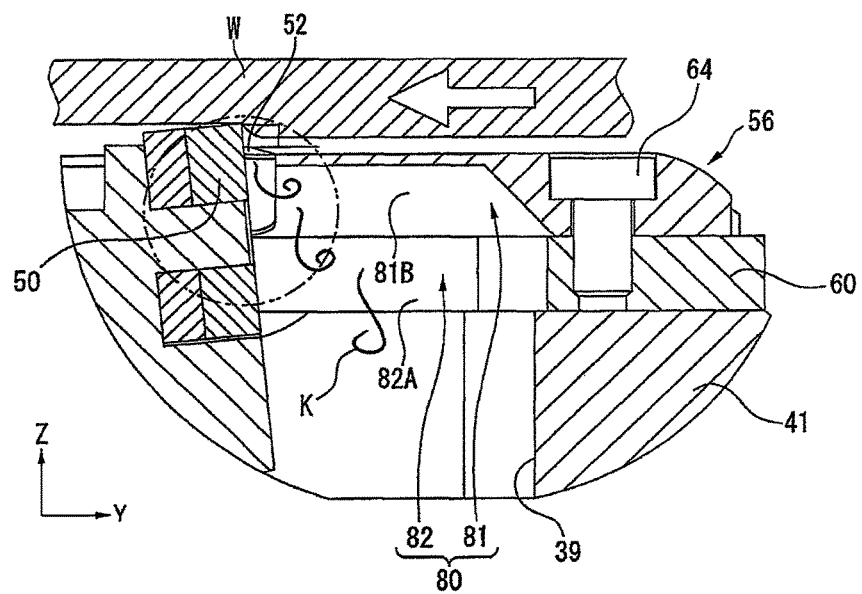
FIG. 13 is a detailed view of FIG. 12.
Figure 14:
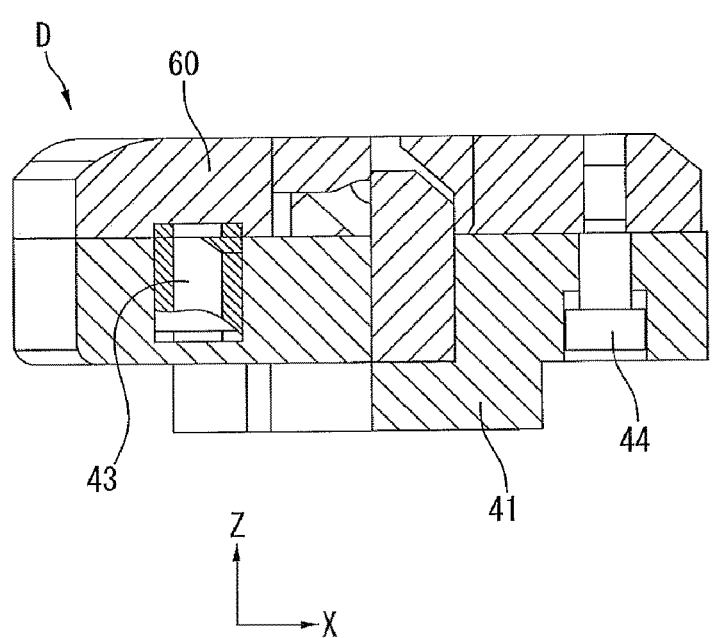
FIG. 14 is a sectional view cut on a line C-C in FIG. 10.

On the other hand, the ejector plate 60 similarly constitutes a simple vertically moving unit instead of the original vertically moving mechanism (FIGS. 12 to 14).

The ejector plate 60 is, as is well-known, urged upward to the die body 41 (FIG. 14) through the spring 43 and the stopper 44 (common also to the first to fourth embodiments), and an operation of the entire fifth embodiment will be described including the operation of this ejector plate 60.

Further, in the fifth embodiment, as described above, a point that the resistance member 56 is fixed to this ejector plate 60 is different from the first to fourth embodiments.

As illustrated in FIGS. 10 to 12, on both sides of the cutting chip 50 and on the ejector plate 60, the rollers 57 and 58 are rotatably provided, and the work W (FIG. 12) is placed on the rollers 57 and 58.

As illustrated in FIG. 12, when the work W is moved, the cutting punch P (FIG. 1) is at an upper limit position, for example, the work W (FIG. 12) is not pressed but is moved along the path line PL, while the ejector plate 60 is urged upward through the spring 43 (FIG. 14) and the stopper 44, and the cutting chip 50 is not brought into contact with the work W and its back surface is not scratched.

However, as illustrated in FIG. 13, when the work W is machined, the cutting punch P (FIG. 1) lowers and presses the work W and thus, the work W (FIG. 13) lowers together with the ejector plate 60 and is moved in contact with the cutting chip 50 and cutting such as V-groove machining is performed, whereby the swarf K is generated, is guided to the aforementioned resistance member 56 and is divided.

That is, the swarf K generated by cutting of the work W passes through the opening portion 52 (FIGS. 10, 13, and 15) formed in the front of the resistance member 56 and is guided to the resistance member 56.

Then, the swarf K is given resistance and is finely divided by the horizontal ceiling wall 81A constituting the first chamber 81 of the division chamber 80, the inclined wall 81B having the U-shape entirety, and the vertical walls 82A and 82B constituting the second chamber 82, and is discharged through the scrap discharge hole 39 to the outside.

Moreover, in summary, the swarf K having passed through the opening portion 52 (FIG. 13) is guided to the resistance member 56, is then given resistance and divided by the first chamber 81 and the second chamber 82 or the first chamber 81 or the second chamber 82 and is discharged through the scrap discharge hole 39 to the outside, whereby clogging by scrap is prevented.

Therefore, according to the present invention, it similarly has an effect of providing a cutting die which finely divides the swarf generated during cutting of the work so as to prevent clogging by scrap, and since clogging by scrap does not occur any more, the back surface of the work W is not scratched by the swarf K, the value of the work W as a product is maintained, and the machining is continued.

The fifth embodiment described above is particularly effective similarly when there is a concern that, as illustrated in FIG. 18(C), continuous long swarf K generated as the result of machining of the long V-groove remains in the scrap discharge hole 39 and causes clogging by scrap.

On the other hand, in the fifth embodiment, as described above, at the position on the die body 41 and corresponding to the rollers 57 and 58 of the ejector plate 60, the space portions 45 and 46 communicating with the scrap discharge hole 39 are formed (FIGS. 11 and 15) and thus, even if the swarf K generated during working of the work W adheres to the rollers 57 and 58 of the ejector plate 60, the adhering swarf K is discharged from the scrap discharge hole 39 through the space portions 45 and 46 to the outside, and clogging by scrap does not occur.

Further, in the fifth embodiment, substantially at the middle of the inclined wall 81B having a U-shape in entirety constituting the first chamber 81 of the division chamber 80 (FIG. 15) and at the position at which the cutting chip 50 is provided, the relief portions 81C (FIG. 15) and 81D to the blade edges 50D (FIG. 11) and 50A of the cutting chip 50 are provided (FIG. 16(B)) and thus, interference between the resistance member 56 vertically moving with the ejector plate 60 and the cutting chip 50 is avoided.

FIGS. 19 to 25 are views illustrating a sixth embodiment of the present invention.

In the sixth embodiment, similarly to the aforementioned first to fourth embodiments and the fifth embodiment, the cutting die D has a columnar trapezoidal shape as a whole as is well-known (FIG. 19), the cutting chip 50 is incorporated, the ejector plate 60 covering the die body 41 including the cutting chip 50 is provided, and a resistance member 59 is fixed to the ejector plate 60.

A difference between the sixth embodiment and the first to fourth embodiments is similar to that between the fifth embodiment and them, and the cutting chip 50 (FIG. 20) is totally the same as that of the fifth embodiment and moreover, a correspondence relation between the resistance member 59 (FIG. 19) and the ejector plate 60, the fixing unit to the ejector plate 60, a relation between the ejector plate 60 and the die body 41, an effect of fixing the resistance member 59 to the ejector plate 60, and the interference avoiding unit between the resistance member 59 and the cutting chip 50 are similar to those of the fifth embodiment, and detailed description will be omitted.

As described above, in the sixth embodiment, the resistance member 59 is fixed to the ejector plate 60 similarly to the fifth embodiment (FIG. 19), and the resistance member 59 will be described below in detail.

Figure 24:
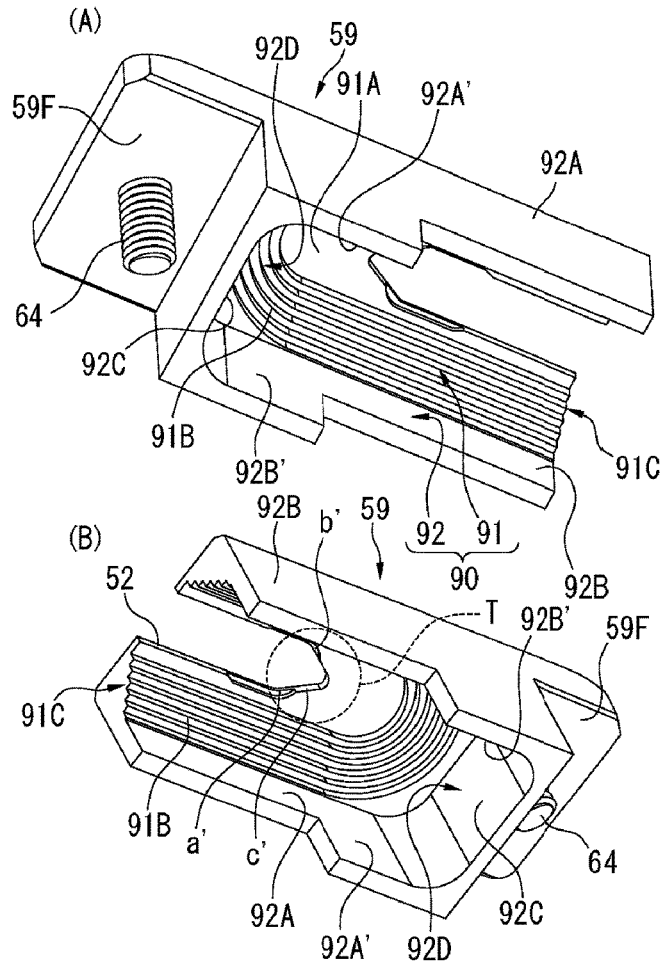
FIG. 24 is a perspective view illustrating a resistance member 59 in FIG. 19.
Figure 25:
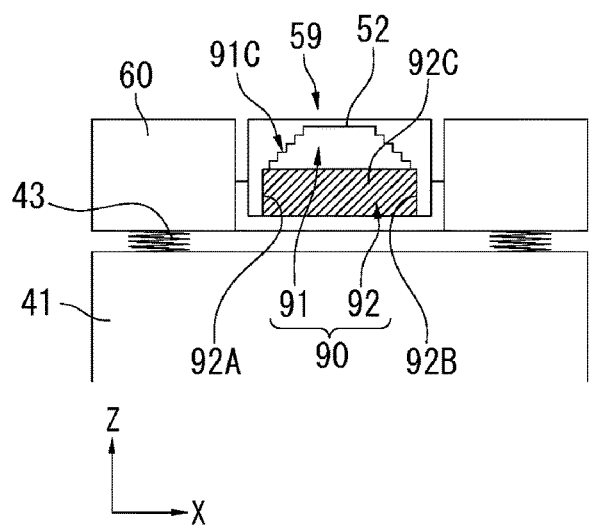
FIG. 25 is a front view of a relation between the resistance member 59 and the ejector plate 60 in FIG. 19 when seen from the cutting chip 50 side.

The resistance member 59 (FIGS. 19 and 24) of this sixth embodiment has the elongated opening portion 52 which is opened at a front side (right side of FIG. 24(A), for example) and from which the cutting chip 50 (FIG. 19) is exposed, and the swarf K (FIG. 22) generated from the work W passes through this opening portion 52 and is guided to the resistance member 59.

A difference of the opening portion 52 between the sixth embodiment (FIG. 19) and the fifth embodiment (FIG. 10) is as follows.

Figure 19:
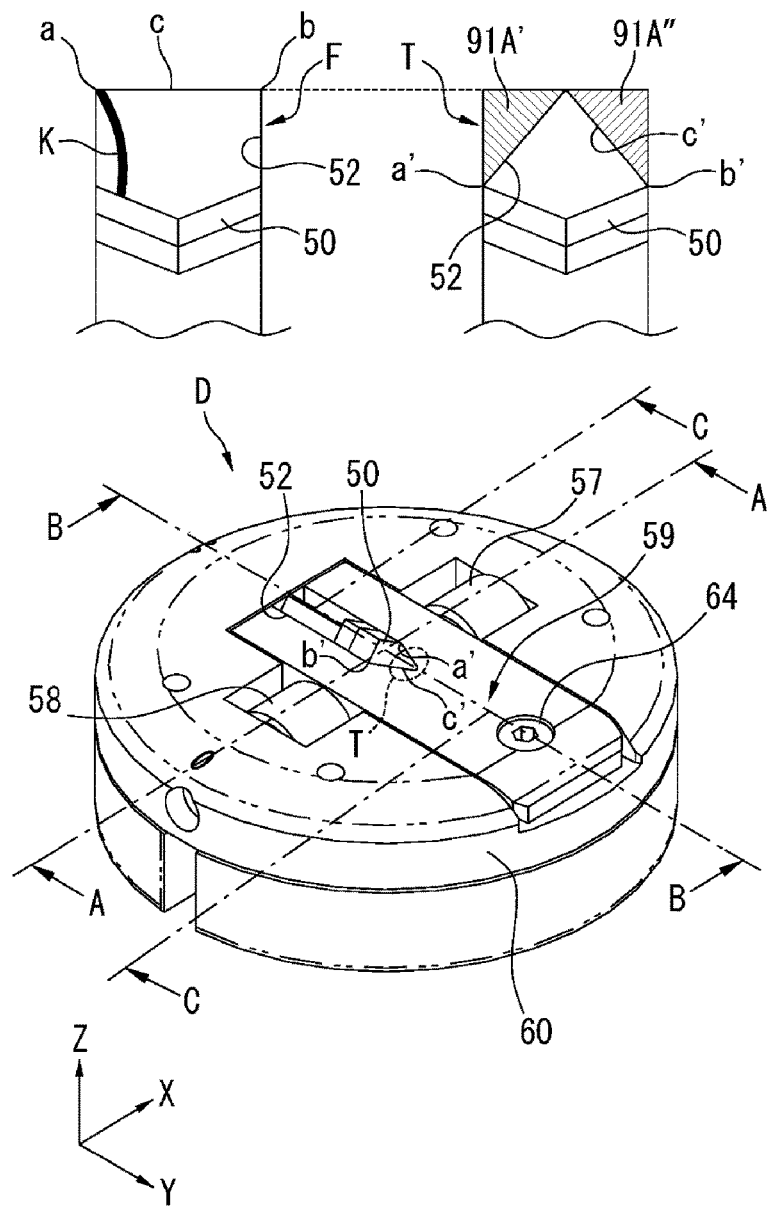
FIG. 19 is an appearance perspective view in a sixth embodiment of the cutting die according to the present invention.
Figure 20:
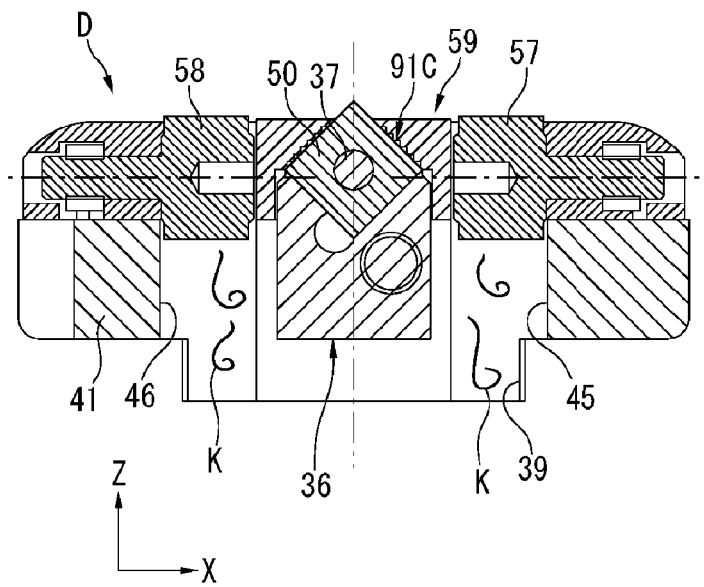
FIG. 20 is a sectional view cut on a line A-A in FIG. 19.
Figure 21:
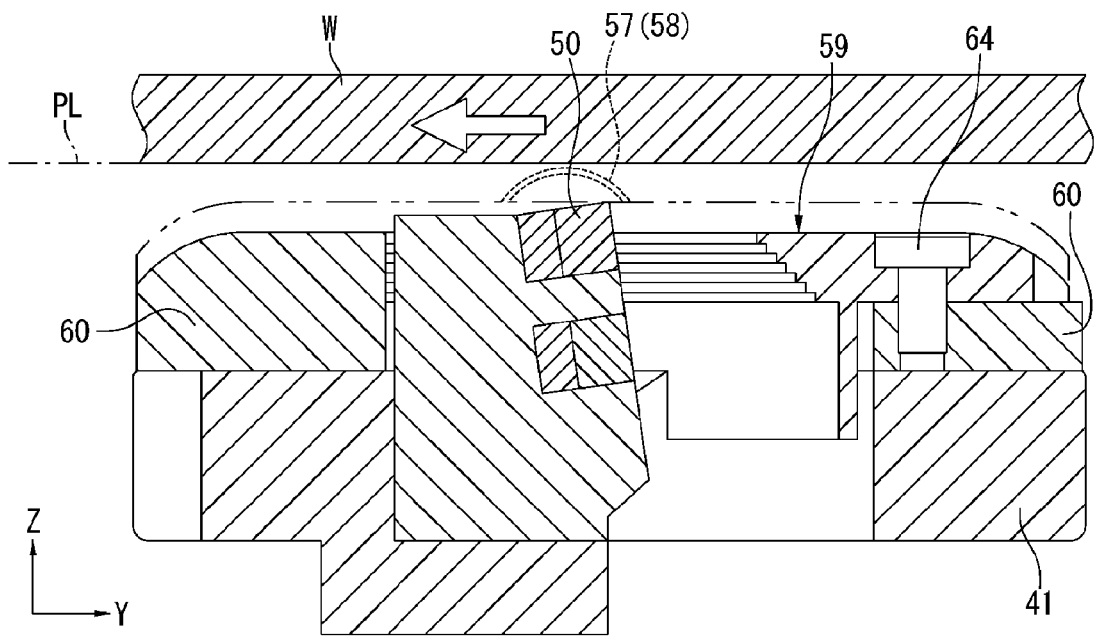
FIG. 21 is a sectional view cut on a line B-B in FIG. 19 (when the ejector plate 60 is raised and lowered).

That is, regarding the opening portions 52 of the sixth embodiment (FIG. 19) and the fifth embodiment (FIG. 10), the rear thereof, in other words, the side (the left side in FIG. 24(A) and the left side in FIG. 15) facing the cutting chip 50 has a triangle T (right in an upper view in FIGS. 19 and 24(B)) with a tapered shape for the former and a square F (FIG. 10 and left in an upper view in FIG. 19) with a tip-expanded shape for the latter.

The shape of the rear (the side facing the cutting chip 50) of the opening portion 52 is changed as described above because there is a difference in a clogging degree by the swarf depending on the cutting method.

For example, as illustrated in FIGS. 14(C) and 14(D) of Japanese Patent Laid-Open No. 2014-172073, by offsetting of a chip center CC in a right-and-left direction with respect to a V-groove center VC and by cutting of the work W with the cutting chip 50, a desired V-groove V3 is formed in some cases.

Then, the swarf generated in this case tries to pass through the opening portion 52 not through the center of the cutting chip 50 but in a state biased to the right side (FIGS. 10 and 19) or the left side.

If the rear side (the side facing the cutting chip 50) of the opening portion 52 is formed by the square F made of a, b, and c as in the fifth embodiment (FIG. 10), the following disadvantage occurs.

That is, the swarf K generated by cutting of the work W with the cutting chip 50 passes through the opening portion 52 not through the center of the cutting chip 50 but in the state biased to the right side or to the left side. The swarf K having passed through is divided while being curled upward in some cases. An action to pop out upward works in the divided swarf K, which is caught between the a portion (FIG. 10 and left in the upper view in FIG. 19) or the b portion and the cutting chip 50 and is not smoothly guided into the resistance member 56 in some cases (FIG. 13).

On the other hand, when the rear of the opening portion 52 is formed by a triangle T made of a', b', and c' as in the sixth embodiment (FIGS. 19 and 24(B)), if the swarf K tries to pop out upward from the state biased to the right side or to the left side, it collides against ceiling walls 91A' and 91A" (an original ceiling wall 91A (a part of FIG. 24(A)) and drops into the scrap discharge hole (right in the upper view in FIG. 19).

Figure 22:
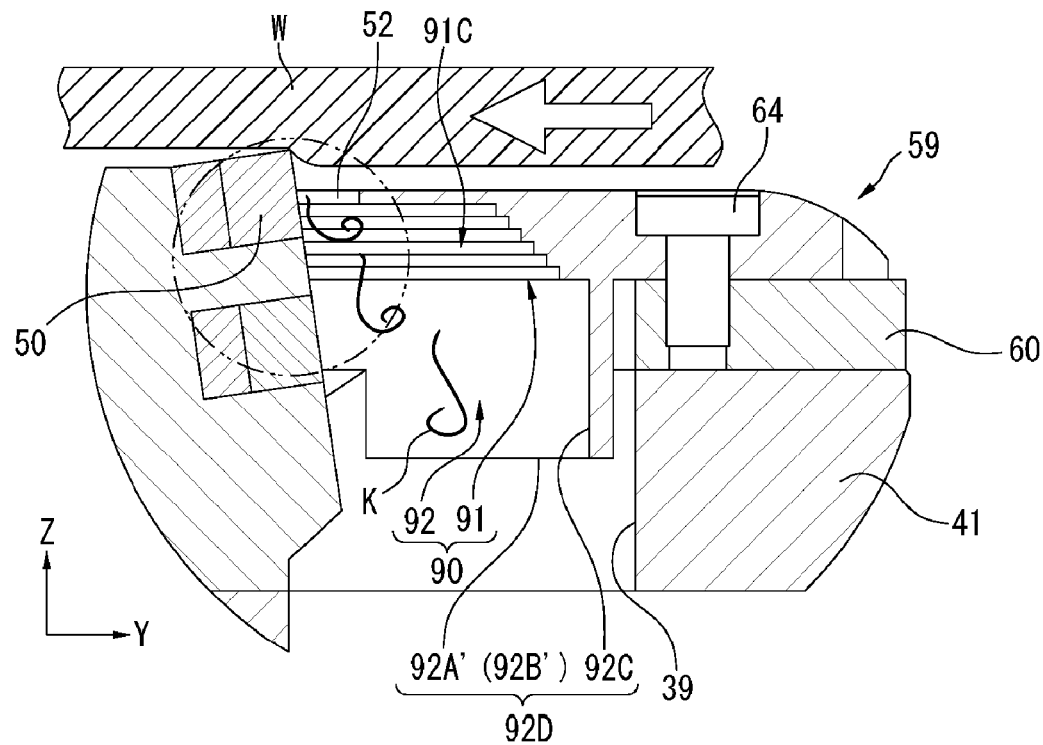
FIG. 22 is a detailed view of FIG. 21.
Figure 23:
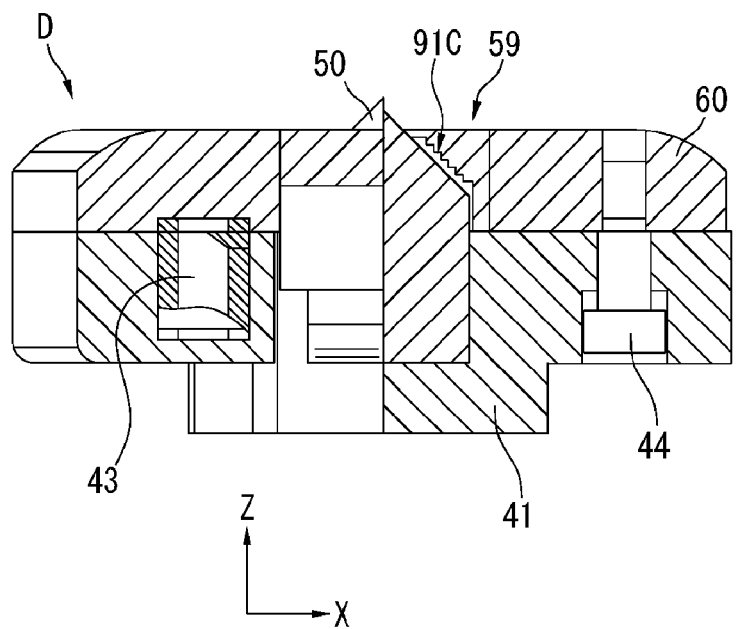
FIG. 23 is a sectional view cut on a line C-C in FIG. 19.

As a result, the swarf K generated by cutting of the work W with the cutting chip 50 is not caught between the opening portion 52 and the chip 50 but is smoothly guided into the resistance member 59 (FIG. 22).

In this case, the triangle T (FIGS. 19 and 24(B)) which is the shape of the rear of the opening portion includes an isosceles triangle, for example. A semi-circular, semi-oval or trapezoidal shape exerts the similar effect as long as it is tapered. Moreover, the tapered opening portion shape can be applied also to the fourth embodiment (FIG. 4) and the fifth embodiment (FIG. 10). Such an arrangement wherein the tapered opening portion shape is applied to the fourth embodiment is schematically depicted in FIG. 26.

On the other hand, inside the resistance member (FIG. 19) of the sixth embodiment (FIG. 24), a division chamber 90 is similarly formed, and the division chamber 90 is constituted by a first chamber communicating with the opening portion 52 and a second chamber 92 which communicates with the first chamber 91 and is located at a position lower than that and the scrap discharge hole 39 side (FIG. 22) of which is opened.

In more detail, the first chamber 91 (FIG. 24) similarly has the horizontal ceiling wall 91A at the same height position as the opening portion 52 and an inclined wall 91B having a U-shape in entirety gradually opening downward continuing to the horizontal ceiling wall 91A and the opening portion 52.

Steps 91C are continuously provided from top to bottom over the inclined wall 91B having a U-shape in entirety.

As a result, the swarf K (FIG. 22) having passed through the opening portion 52 which is a part of the open portion 152, that is, the open portion 152(52) between the cutting chip 50 and the resistance member 59 and guided to the resistance member 59 is given stronger resistance and is further finely divided by a corner part of the steps 91C provided on the inclined wall 91B constituting the first chamber 91 of the division chamber 90 and is discharged from the scrap discharge hole 39 to the outside.

In this case, in the fifth embodiment (FIG. 10), regarding only the inclined wall 81B of the first chamber 81 constituting the division chamber 80 (FIG. 15) inside the resistance member 56, the swarf K (FIG. 13) is given resistance by the simply flat inclined wall 81B (FIGS. 13 and 15) on which the steps 91C (FIG. 22) as in the sixth embodiment are not provided, but the resistance is relatively small.

Therefore, when the sixth embodiment (FIGS. 22 and 24) and the fifth embodiment (FIGS. 13 and 15) are compared, a division effect of the swarf K by the inclined wall is stronger in the sixth embodiment. Note that the steps 91C (FIG. 22) can be also applied to the fourth embodiment (FIG. 4) and to the fifth embodiment (FIG. 10).

On the other hand, the second chamber 92 (FIG. 24) constituting the division chamber 90 in the sixth embodiment similarly has vertical walls 92A and 92B.

The vertical walls 92A and 92B constitute the aforementioned first chamber 91 and moreover, they are provided along the longitudinal direction (Y-axis direction) of the linear portion on both sides of the lowermost end of the entirely U-shaped inclined wall 91B on which the steps 91C are provided.

Moreover, in the sixth embodiment, an entry preventing wall 92C (FIG. 24) connecting the both vertical walls 92A and 92B is provided on a rear portion 59F side of the resistance member 59, that is, the side fixed to the ejector plate 60 (FIG. 19) by insertion of the bolt 64 or the like.

As a result, the swarf K divided by the first chamber 91 and the second chamber 92 constituting the division chamber 90 (FIGS. 22 and 24) of the sixth embodiment is inhibited by this entry preventing wall 92C and does not enter the gap formed between the vertically moving ejector plate 60 and the die body 41 and the vertically moving operation (FIG. 23) of the ejector plate 60 is performed extremely smoothly.

In this regard, in the fifth embodiment (FIG. 15), in the both vertical walls 82A and 82B constituting the second chamber 82 of the division chamber 80, there is no means for connecting the both and thus, the swarf K (FIG. 13) enters the gap between the ejector plate 60 and the die body 41 and prevents a smooth vertically moving operation of the ejector plate 60 in some cases.

In the sixth embodiment (FIGS. 19, 22, and 24), the both vertical walls 92A and 92B (FIG. 24) constituting the second chamber 92 of the division chamber 90 become deeper as they get closer to the side fixed to the ejector plate 60 which is the rear portion 59F side of the resistance member 59 (92A', 92B').

The entry preventing wall 92C connecting the deeper portions 92A' and 92B' (FIGS. 24(A) and 24(B)) is provided on the rear portion 59F side of the resistance member 59.

With this constitution, in the sixth embodiment, an entirely U-shaped chamber 92D (FIGS. 22 and 24) surrounded by the aforementioned deeper portions 92A' and 92B' and the entry preventing wall 92C connecting the both portions 92A' and 92B' is fully contained in the scrap discharge hole 39 and moreover, completely covers the gap between the ejector plate 60 and the die body 41.

Thus, the swarf K generated from the work W (FIG. 22) during working is prevented by the U-shaped chamber 29D and does not enter the gap between the ejector plate 60 and the die body 41 as described above.

Note that the entry preventing wall 92C (FIG. 24) can be also applied to the fifth embodiment (FIG. 10).

An operation of the sixth embodiment having the aforementioned constitution will be described below.

That is, the work W gripped by the clamp 13 (FIG. 17) constituting a work positioning device is positioned at a working position K1 (FIG. 17(B)), and it is moved in an arrow direction with the work W placed on the rollers 57 (FIG. 21) and 58.

In this case, when the work W is moved (FIG. 21), the cutting punch P (FIG. 1) is at the upper limit position, for example, the work W (FIG. 21) is not pressed but is moved along the path line PL, while the ejector plate 60 is similarly urged upward (FIG. 23), but when the work W is machined (FIG. 22), the cutting punch P (FIG. 1) lowers and presses the work W and thus, the work W lowers together with the ejector plate 60 (FIG. 22) and as illustrated, moves in contact with the cutting chip 50 and performs cutting such as V-groove machining, and the generated swarf K passes through the opening portion 52 and is guided and divided by the resistance member 59.

When the work W (FIG. 22) is machined by a cutting method illustrated in FIGS. 14(C) and 14(D) in the aforementioned Japanese Patent Laid-Open No. 2014-172073, for example, the generated swarf K (FIG. 22) tries to pass through the opening portion 52 in the state biased to the right end (FIG. 19) or the left side of the cutting chip 50.

However, in the sixth embodiment (FIGS. 19 and 24(B)), since the rear of the opening portion 52 is formed by the isosceles triangle T, for example, as described above, and moreover, since an angle of an a' part or a b' part is dull, for example, the generated swarf K is not caught by the a' part or the b' part but is smoothly guided into the resistance member 59 (FIG. 22).

Then, the swarf K guided into the resistance member (FIG. 22) is given strong resistance by the steps 91C provided in the first chamber 91 constituting the division chamber 90 and thus, it is further finely divided, whereby clogging by scrap is prevented.

Moreover, the further finely divided swarf K (FIG. 22) tries to enter the gap between the ejector plate 60 and the die body 41, but since the entry preventing wall 92C connecting the both vertical walls 92A and 92B of the second chamber 92 constituting the division chamber 90 is provided, the entry is prevented, and the smooth vertically moving operation of the ejector plate 60 is guaranteed.

FIG. 17 is a view illustrating a turret punch press in the punch press to which the present invention is applied, and the turret punch press has the upper turret 6 and the lower turret 7 as described above (FIG. 1).

On the upper turret 6 and the lower turret 7, tool including the cutting die D (FIGS. 1 to 16) according to the present invention and the cutting punch P collaborating with it and tools including various punches P and dies D for punching, molding, and the like are concentrically arranged, respectively.

In this case, if a well-known auto-index device (tool rotating mechanism) is installed, though the cutting chip 50 (FIG. 7) is used as before, only direction of cutting can be made different (though the cutting was performed along the Y-axis direction until now, for example, as illustrated in FIG. 7, when the cutting is to be performed in an X-axis direction orthogonal to that in a subsequent process) and thus, working time can be reduced.

Chains 4 and 5 are wound around a rotating shaft 8 of the upper turret 6 (FIG. 17(B)) and a rotating shaft 9 of the lower turret 7, respectively, and the chains 4 and 5 are wound around a driving shaft 3, while, immediately above the punch P at the working position K1 and on the upper frame 1, as described above (FIG. 1), the ram striker 2 for pressing the cutting punch P and pushing down the entire punch P is provided, for example.

With this constitution, when the chains 4 and 5 are circulated by rotation of the driving shaft 3 with a motor M, the upper turret 6 and the lower turret 7 are synchronously rotated, and the tool including the predetermined punch P and die D, that is, the tool including the cutting die D (FIG. 1) according to the present invention and the cutting punch P collaborating with that, for example, can be selected at the working position K1.

In this case, depending on a plate thickness, a material and the like of the work W to be machined, a length of the generated swarf K (FIG. 18), a degree of curling and the like are different, and a degree of difficulty of clogging by scrap is made different in accordance with that and thus, the optimal cutting die D according to the present invention to be used and the cutting punch P collaborating with that can be selected from among FIGS. 1 to 4 and FIG. 10, for example.

A Y-axis LM guide rail 17 is laid on a lower frame (FIG. 17(B)) of the turret punch press, a support bracket 16 is slidingly connected to the Y-axis LM guide rail 17, a carriage base 11 is placed on the support bracket 16, a ball screw 14 of a Y-axis motor My provided on the upper frame 1 is screwed with the carriage base 11, a carriage 12 on which the clamp 13 is mounted is slidingly connected to an X-axis LM guide rail (not shown) on the carriage base 11, and a ball screw 15 of an X-axis motor Mx (FIG. 17(A)) is screwed with the carriage 12.

Moreover, at a center of the turret punch press, a center table 10 is fixed, side tables 10A and 10B are arranged on both sides of the fixing table 10, and the side tables 10A and 10B are mounted on the support bracket 16.

With this constitution, the carriage 12 is moved in the X-axis direction on the carriage base 11 by rotation of the X-axis motor Mx, while the carriage base 11 supported by the support bracket 16 is moved in the Y-axis direction together with the side tables 10A and 10B by rotation of the Y-axis motor My (FIG. 10(A)).

Therefore, in a state where the tool including the cutting die D (FIG. 1) according to the present invention and the cutting punch P collaborating with that is selected at the working position K1, the work W gripped by the clamp 13 (FIG. 1) mounted on the carriage 12 (FIG. 17) is positioned at the working position K1, and the work W is moved on the cutting chip 50 as it is, whereby the cutting such as V-groove machining can be performed by the cutting die D according to the present invention.

As a result, whichever direction the moving direction of the work W is (whether it is the Y-axis direction or the X-axis direction, for example), a relation between the swarf K (FIGS. 1 to 3, FIGS. 7, 13, and 22) generated by the cutting and the resistance members 51, 53, 55, 56, and 59 constituting the present invention is constant, and the swarf K passes through the opening portion 52 on the front and is guided and collides against the resistance member 51, 53, 55, 56 or 59, is given resistance, finely divided and discharged from the scrap discharge hole 39 to the outside.

Thus, similarly, according to the present invention, there is exerted the effect of providing the cutting die which finely divides the swarf generated during cutting of the work and prevents clogging by scrap, and as a result, clogging by scrap does not occur any more and thus, the back surface of the work W is not scratched by the swarf K any more, the value of the work W as a product is maintained, and machining is continued.

INDUSTRIAL APPLICABILITY

The present invention is used in the cutting die which finely divides the swarf generated during cutting of the work and prevents clogging by scrap and moreover, it is applied not only to a single punch press in which a pair of tools is arranged but also to a turret punch press having an upper turret and a lower turret in which plurality of pairs of tools is arranged, which is extremely useful.

REFERENCE SIGNS LIST

1 upper frame
2 ram striker
6 upper turret
7 lower turret
13 clamp
21 lower frame
31 lift spring
36 chip holder
37, 38 bolt
39 scrap discharge hole
40 through hole
41 die body
43 spring
44 stopper
50 cutting chip
51, 53, 55; 56, 59 resistance member
57, 58 roller
60 ejector plate
61, 62, 63, 64 fixing unit
70, 80, 90 division chamber
D cutting die
K swarf
P cutting punch
W work

The invention claimed is:

1. A cutting die applied to a punch press, the cutting die having a cutting chip, and the cutting die cutting a work in collaboration with a cutting punch, the cutting die comprising:
    a resistance member having an opening portion through which swarf generated during cutting of a work via the cutting chip passes, wherein the resistance member divides the swarf by imparting resistance to the swarf, the resistance member being provided proximate a scrap discharge hole so that the divided swarf does not remain in the scrap discharge hole but is discharged outside of the scrap discharge hole so as to prevent clogging of the scrap discharge hole by the divided swarf, and
    a rear surface of the opening portion being defined at an end of the opening portion that is rearward of a forward position defined at the location of the cutting chip,
    wherein a shape of the rear surface of the opening portion is tapered.

2. The cutting die according to claim 1, wherein when the resistance member is fixed to a body of the die:
    the resistance member is supported by a chip holder of the cutting chip, two side plates of the chip holder extend from a head portion of the chip holder, to which head portion the cutting chip is fixed, a base of the chip holder is provided on lower parts of the two side plates, and an end surface of the resistance member is proximate the cutting chip and the head portion of the chip holder, two side surfaces of the resistance member are each proximate a respective one of the two side plates of the chip holder, and an upper surface of the resistance member and a further end surface of the resistance member are exposed from the chip holder, and an end portion of the resistance member is fixed to the die body through the base of the chip holder.

3. The cutting die according to claim 1, wherein when the resistance member is fixed to an ejector plate:

an outer side surface of the resistance member is proximate a roller provided on the ejector plate side, and is proximate an inner side surface of the ejector, an upper surface of the resistance member and an end surface of the resistance member are exposed from the ejector plate, and an end portion of the resistance member is fixed to the ejector plate through a stepped portion of the ejector plate.

4. A cutting die applied to a punch press, the cutting die having a cutting chip, and the cutting die cutting a work in collaboration with a cutting punch, the cutting die comprising:

a resistance member for guiding swarf generated during cutting of the work via the cutting chip, wherein an opening portion is formed in the resistance member at an open portion side of the resistance member, wherein the resistance member divides the swarf by imparting resistance to the swarf, the resistance member being provided on an upper part of a scrap discharge hole so that the divided swarf does not remain in the scrap discharge hole but is discharged outside of the scrap discharge hole so as to prevent clogging of the scrap discharge hole by the divided swarf, the resistance member has an overall cuboid shape, wherein a division chamber is formed within the resistance member, the division chamber communicating with the scrap discharge hole at the open portion side of the resistance member, and wherein the division chamber communicates with the scrap discharge hole at a lower side of the resistance member, and a rear surface of the opening portion being defined at an end of the opening portion that is rearward of a forward position defined at the location of the cutting chip, wherein a shape of the rear surface of the opening portion is tapered.

5. The cutting die according to claim 4, wherein when the resistance member is fixed to a body of the die:

the resistance member is supported by a chip holder of the cutting chip, two side plates of the chip holder extend from a head portion of the chip holder, to which head portion the cutting chip is fixed, a base of the chip holder is provided on lower parts of the two side plates, and an end surface of the resistance member is proximate the cutting chip and the head portion of the chip holder, two side surfaces of the resistance member are each proximate a respective one of the two side plates of the chip holder, and an upper surface of the resistance member and a further end surface of the resistance member are exposed from the chip holder, and an end portion of the resistance member is fixed to the die body through the base of the chip holder.

6. The cutting die according to claim 4, wherein when the resistance member is fixed to an ejector plate:

an outer side surface of the resistance member is proximate a roller provided on the ejector plate side, and is proximate an inner side surface of the ejector, an upper surface of the resistance member and an end surface of the resistance member are exposed from the ejector plate, and an end portion of the resistance member is fixed to the ejector plate through a stepped portion of the ejector plate.

\* \* \* \* \*